Nov. 14, 1933. H. J. WILLS Re. 19,003
AUTOMATIC LAPPING MACHINE
Original Filed Dec. 26, 1928
Fig. 3
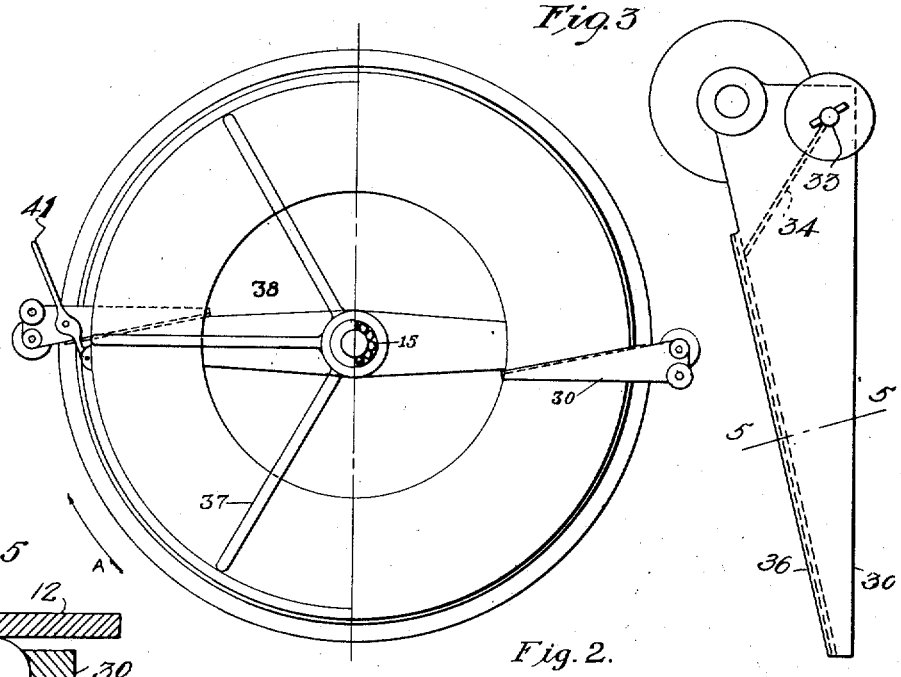
Fig. 2.
Fig. 5
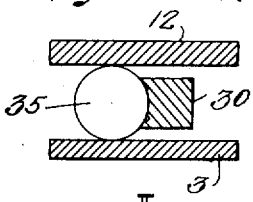
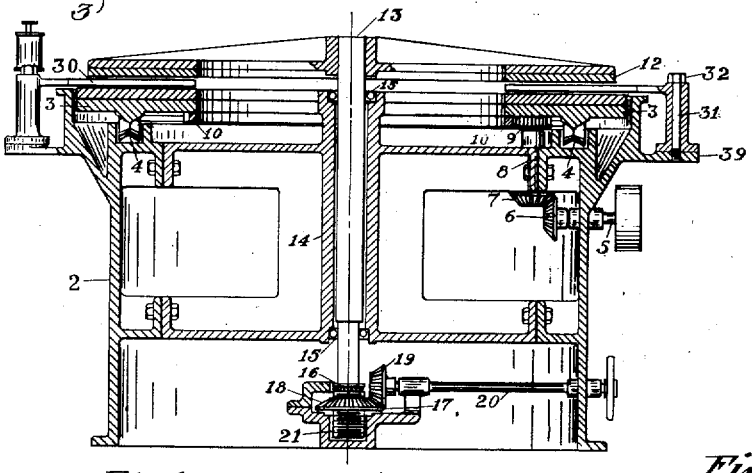
Fig. 1.
Fig. 6
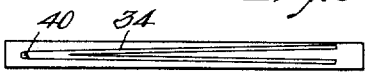
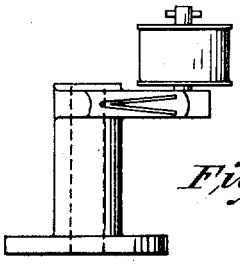
Fig. 4
INVENTOR
Herbert J. Wills
BY Thomas C. MacKay
ATTORNEY Reissued Nov. 14, 1933

Re. 19,003

UNITED STATES PATENT OFFICE 19,003

AUTOMATIC LAPPING MACHINE

Herbert J. Wills, Niagara Falls, N. Y., assignor to The Carborundum Company

Original No. 1,784,648, dated December 9, 1930, Serial No. 328,556, December 26, 1928. Application for reissue November 27, 1931. Serial No. 577,718

7 Claims. (Cl. 51—156)

My invention relates to an improvement in automatic lapping machines, in which articles to be polished are to be dropped into the machine which rolls them around in contact with abrasive material and against moving or stationary parts in a manner to give the article the suitable amount of lapping or abrasive action before it is discharged into a hopper. The object of my invention is to provide a machine which is of a very simple character and which is also automatic in its action by reason of the angular relation of an adjustable stationary part with respect to certain rotatable (or floating and stationary parts.)

Lapping machines ordinarily have an upper lapping plate and a lower lapping plate mounted on parallel or coincident vertical axes. Between the upper and lower plates is mounted a work-holder which is usually mounted to carry the parts to be lapped in complicated (and where possible non-repeating) paths to prevent the grinding becoming localized with a resulting uneven working on the article. These work-holders have in general to be provided with carefully shaped matrices which have to be filled by hand with the articles to be ground or lapped, and which, due to the abrasion, wear rapidly requiring frequent renewals. Frequently parts to be lapped stick in these matrices with resultant flat spots. In some cases stop mechanism is provided which prevents the approach of the lapping plates toward each other too closely and so limits the grinding done on the articles. In many cases however it is unnecessary to grind the article extensively. Centerless grinding machines for example turn out cylindrical bodies such as piston pins which are uniform within a few ten thousandths of an inch. Such cylindrical articles often require therefore only a small amount of lapping. It is the object of my invention to lap such articles in large numbers, the articles being fed automatically at the outer circumferences of the lapping plates and discharged (after the lapping operation) through an interior opening in the lower lapping plate.

My invention is illustrated by the accompanying drawing in which:

Figure 1 is a vertical section showing upper and lower operating plates and lapping bars intermediate the operating plates;

Figure 2 represents a plan view (seen from above), the right half of the upper operating plate having been removed;

Figure 3 represents a plan view of the lapping bar;

Figure 4 is an elevation showing the support for the lapping bar;

Figure 5 is a section on the line 5—5 of Fig. 3; and

Figure 6 is an edge view of the lapping surface 36 showing grooves along which abrasive material distributes itself.

In Figure 1 a frame 2 carries a lower operating plate 3 which is supported on bearings 4 located about midway between the inner and outer radial edges of the lower operating plate. The lower lapping plate is rotated by means of a driving shaft 5 from which the drive is through a bevel driving gear 6, a driven bevel gear 7, a shaft 8, a spur pinion 9 and a spur driven gear 10, which driven gear is secured to the lower side of the table 3. An upper plate 12 is mounted concentrically with the lower plate 3 on the upper end of an extended shaft 13. This shaft is separated from a cylindrical portion 14 of the frame 2 by means of radial bearings 15. The weight of the upper plate is carried partly by the parts to be lapped and partly by the shaft 13 which is supported on a step bearing 16. The lower end of the shaft 13 is threaded to engage with a nut 17 having bevelled teeth which are engaged by a bevel pinion 19 mounted on a shaft 20. The lower end of the shaft 13 is slidably engaged with the frame at 21. With the mechanism just described the plate 12 may be raised or lowered by turning the shaft 20.

A series of lapping bars 30 are adjustably mounted on the frame 2 in a position to project between the lower and upper operating plates. These bars 30 may be fixed at any desired position to which they have been rotated by tightening the bolt 31 by means of a wrench applied to the head 32. The lapping surface of the lapping bar 30 is indicated at 36. This surface as shown in Fig. 5 has a vertical section which is the arc of a circle. Most of the lapping is done on this circular surface. In Figure 5 a cylindrical article (to be lapped) 35 is indicated as in contact with a lapping bar 30.

Abrasive grains carried by suitable vehicles (lubricants, etc.) are supplied through a cup 33 from which they are fed through a channel 34 and an opening 40 in the working surface of the lapping bar.

An index may be provided on the edge 39 of the bar support to indicate various angular positions of the lapping bar 30 with respect to a plane passing through the axis of rotation of the operating plates and the axis of rotation of the lapping bar 30.

The upper operating plate is strengthened by means of radial ribs 37.

In operating the device which is the subject of my invention piston pins or other cylindrical articles are fed by gravity from a hopper to the outer edge of the lower lapping plate. They are rotated against the lapping bar and carried inward by the lower operating plate until they reach the surface 36 of the lapping bar 30, where they are rolled in contact with the lower operating plate, the lapping bar and the upper operating plate. The vertical position of the latter plate may be controlled by the operator by rotation of the shaft 20 as mentioned above.

If the rotation of the lower operating plate be in the direction indicated by the arrow A as shown in Fig. 2, the frictional forces exerted by the lower plate will tend to carry the articles inward along the lapping bar until they fall through the interior opening 38, into a receptacle beneath. By adjusting the lapping bars to different angular positions as mentioned above the length of time that the articles are lapped may be varied to suit the amount of lapping required.

While in the description cylindrical articles such as piston pins have been mentioned particularly as adapted to be lapped by my machine, articles having flat surfaces (either round or rectangular) may also be lapped, in which case, both plates are driven in the same direction but at different speeds.

By feeding abrasive grains to the outer ends only of the lapping bar, parts may be both lapped and polished in one complete operation. The lapping bar may be of cast iron, brass, copper or metal provided with a wooden face to suit many conditions.

By applying a brake on the upper plate the abrasive action may be considerably increased. The abrasive action may also be controlled by such factors as the angle of the lapping bar, the speed of the operating plate, the weight of the top floating plate, the selection of the abrasive, the point of application of the abrasive on the bar, and by the composition of the face of the lapping bar. A conventional brake 41 is indicated in Fig. 2.

Both plates and the lapping bar may be made of an abrasive embedded in vitrified clay or rubber. Redmanol or shellac bonds or composite wheels made of iron metal parts and abrasive parts may be used. In this case a thin lubricant would be fed through parts in the lapping bar.

As compared with the prior art my operating plates do not require frequent resurfacing.

My machines are particularly adapted for mass production since each machine automatically laps a large number of articles in succession and one operator may attend to a number of machines.

My machine illustrates a novel process of lapping or grinding cylindrical or spherical parts, particularly in the character of the automatic operation. The duration of the automatic lapping process is regulated by means of an angular difference between the generating lines of a fixed lapping surface and the adjacent radius of a roating driving member. Other machines than the one I have illustrated in the drawing may be used for carrying out my novel process of automatic lapping provided that the driving means simultaneously rotates and translates the cylindrical and spherical part to be lapped and provided that the duration of the lapping process may be automatically regulated by the simple variation of the relative angular position of a rotatable driving means and a stationary lapping means.

I claim:

1. An automatic lapping machine for approximately cylindrical parts comprising in combination a lower operating plate with plane upper surface and having a central outlet opening, an upper floating plate with plane lower surface, a lapping bar held in a predetermined position between said lower and upper plates, said lapping bar having a grooved grinding surface whose generating lines are parallel to said plane surfaces of said plates and are inclined to the adjacent radii of said plates, means for rotating said lower plate to revolve approximately cylindrical objects to be lapped against the grinding surface of said lapping bar as well as against the upper plate, the rotation of the lower plate being in such a direction that the frictional forces exerted by the lower plate on the objects to be lapped have components toward the central opening of the lower plate, means for adjusting the height of said upper plate above said lower plate, and means for adjusting the angular position of said lapping bar in a plane parallel to the plane surfaces of the plates which contact with the cylinders, whereby the time of travel of the cylindrical parts from the circumference of the lower plate to the central opening thereof may be varied.

2. An automatic lapping machine comprising in combination an operating plate having a plane upper surface and having a central outlet opening, a lapping bar held in a predetermined position above said operating plate, said lapping bar having a grooved grinding surface whose generating lines are parallel to the upper surface of said operating plate, and means for rotating said operating plate to revolve approximately cylindrical objects to be lapped against the grinding surface of said lapping bar, the rotation of the operating plate being in such a direction that the frictional forces exerted by the operating plate on the objects to be lapped have components toward the central opening of the operating plate, and means for adjusting the angular position of said lapping bar in a plane parallel to the upper surface of the operating plate whereby the duration of the lapping of the articles to be lapped may be varied at the will of the operator.

3. The lapping machine described in claim 1 in which the lapping bar contains means for feeding abrasive grains and necessary lubricant at the lapping surface of the lapping bar.

4. The lapping machine described in claim 2 in which the lapping bar contains means for feeding abrasive grains and necessary lubricant at the lapping surface of the lapping bar.

5. The lapping machine described in claim 1 in which the intensity of the lapping action is varied by the application of a brake to the upper plate.

6. An abrading machine for grinding short cylindrical parts or spheres of like diameter comprising a driving member in the form of an annular disk mounted to rotate around a vertical axis, a stationary but adjustable bar of abrasive material mounted just above said driving member, said bar being recessed along a length which permits simultaneous contact of the bar with a plurality of parts, and a third member arranged to confine the parts to be abraded while they are rotated against and moved in one direction along the groove of the abrading bar.

7. A lapping machine for finishing short cylindrical parts or spheres of like diameter comprising a driving member in the form of an annular disk mounted to rotate around a vertical axis, a stationary but adjustable bar of soft material mounted just above said driving member, said bar being recessed along a length which permits simultaneous contact of the bar with a plurality of parts, a third member arranged to confine the parts to be lapped while they are rotated against and moved in one direction along the groove of the adjustable bar, and means for supplying finely divided abrasive to the groove.

HERBERT J. WILLS.